United States Patent [19]

Blasciak et al.

[11] Patent Number: 5,265,254
[45] Date of Patent: Nov. 23, 1993

[54] SYSTEM OF DEBUGGING SOFTWARE THROUGH USE OF CODE MARKERS INSERTED INTO SPACES IN THE SOURCE CODE DURING AND AFTER COMPILATION

[75] Inventors: Andrew Blasciak, Colorado Springs; Greg Parets, Loveland, both of Colo.

[73] Assignee: Hewlett-Packard Company, Palo Alto, Calif.

[21] Appl. No.: 744,849

[22] Filed: Aug. 14, 1991

[51] Int. Cl.⁵ .................................................. G06F 7/00
[52] U.S. Cl. .................................... 395/700; 371/19; 395/575; 364/275.5; 364/267.91; 364/267; 364/DIG. 1
[58] Field of Search ............... 395/275, 700, 800, 575, 395/400; 371/19

[56] References Cited

U.S. PATENT DOCUMENTS

| | | | |
|---|---|---|---|
| 4,802,165 | 1/1989 | Ream | 371/19 |
| 4,845,615 | 7/1989 | Blasciak | 395/400 |
| 5,047,919 | 9/1991 | Sterling et al. | 395/575 |
| 5,103,394 | 4/1992 | Blasciak | 395/575 |
| 5,121,501 | 6/1992 | Baungartner et al. | 395/800 |

OTHER PUBLICATIONS

Compilers, Principles, Techniques and Tools pp. 1-23 by Alfred V. Aho, Ravi Sethi, Jeffrey D. Ullman 1986.

*Primary Examiner*—Thomas C. Lee
*Assistant Examiner*—Jennifer M. Orzech

[57] ABSTRACT

A system for inserting code markers for observing indications (external to the microprocessor upon which the software operates) of the occurrence of an event in the execution of the software. Additional instructions or markers are added to the software to be debugged to produce simple, encoded, memory references to otherwise unused memory or I/O locations that will always be visible to a logic analyzer as bus cycles. Although the code markers cause a minimal intrusion in the underlying software, they make tracing events by a conventional logic analyzer much simpler and allow for performance evaluations in manners not heretofore possible. In particular, the inserted code markers provide a method of dynamically extracting information from a running software system under test using simple low intrusion print statements, encoded I/O writes on procedure entries and exits and the like. Generally, the code markers are inserted at compile time or interactively during the debug session to make visible critical points in the code execution, such as function calls, task creation, semaphore operations and other resource usage so as to speed isolation of problems at test points during debugging.

13 Claims, 7 Drawing Sheets

| ADDRESS | DESCRIPTION |
|---|---|
| 0000 | VECTOR SPACE |
| . . | |
| 03ff | |
| 0400 | OPERATING SYSTEM |
| : : | |
| : : | |
| : : | |
| 1fff | |
| 2000 | USER FUNCTION1 |
| . . | |
| 204f | |
| 2050 | MARKER DEAD SPACE FOR FUNCTION1 |
| . . | |
| 2057 | |
| 2058 | USER FUNCTION2 |
| . . | |
| 2637 | |
| 2638 | MARKER DEAD SPACE FOR FUNCTION2 |
| . . | |
| 2660 | |
| . . | |
| . . | |
| . . | |
| . . | |
| 97f0 | USER FUNCTIONN |
| . . | |
| 9a5f | |
| 9a60 | MARKER DEAD SPACE FOR FUNCTIONN |
| . . | |
| 9af8 | |
| a000 | USER DATA SPACE |
| . . | |
| afff | |
| b000 | MARKER TYPE DEFINITION AREA (128 BYTES) |
| . . | |
| b004 | printmk_o |
| b008 | printmk_d |
| b00c | procmk |
| b010 | osmk_o |
| bo14 | osmk_d |
| b018 | usermk |
| . . | |
| b07f | |

*Fig. 7*

EXAMPLE OF CODE MARKER INSTRUMENTATION TO PRINT WRITES TO VARIABLE "a"

| MEMORY ADDRESS | C SOURCE CODE | INSTRUMENTATION FOR HW COLLECTION | INSTRUMENTATION FOR SW COLLECTION |
|---|---|---|---|
| 1000H | funct_a (l,j)<br>int l,j;<br>{<br>a=l+j;<br>j=l*a;<br>for (i=o; i<j; i++)<br>{<br>a=j;<br>} | funct_a (l,j)<br>int l,j;<br>{<br>a=l+j;<br>--> printmk_o=MK_ID0001;<br>--> printmk_d=a;<br>j=l*a;<br>for (i=0; i<j; i++)<br>{<br>a=j;<br>--> printmk_o=MK_ID0002;<br>--> printmk_d=a;<br>} | funct_a (l,j)<br>int l,j;<br>{<br>a=l+j;<br>tool (printmk_o,MK_ID0001);<br>tool (printmk_d,a);<br>j=l*a;<br>for (i=0; i<j; i++)<br>{<br>a=j;<br>tool (printmk_o, MK_ID0002);<br>tool (printmk_d, a);<br>} |
| 1020H | } | | |
| 1022H | MDSfunct_a()<br>{<br>#pragma ASM<br>nop<br>nop<br>nop<br>nop<br>nop<br>#pragma END_ASM | [ OVERLAPPED DEAD AREA ]<br>nop<br>nop<br>#pragma END_ASM | nop<br>nop<br>#pragma END-ASM |
| 102AH | } | } | } |

--> Inserted code

*Fig. 8*

SYSTEM OF DEBUGGING SOFTWARE THROUGH USE OF CODE MARKERS INSERTED INTO SPACES IN THE SOURCE CODE DURING AND AFTER COMPILATION

BACKGROUND OF THE INVENTION

1. Field of the Invention

The present invention relates to a system for analyzing and debugging software through dynamic and interactive use of code markers, and more particularly, to a system and method of using code markers to analyze complex host computer and embedded microprocessor based software systems, even those with on-board caches and queues, so as to eliminate most dependencies on particular processors and language systems.

2. Description of the Prior Art

In recent years, software has had increasing importance in the computer industry. Software is used to control many increasingly complex processes, and the software itself has accordingly become increasingly complex. Many tools have been developed for assisting a software engineer in the development of such complex software. Such tools include compilers, assemblers, linkers, editors and the like, as well as other specification and design tools, configuration management tools, language smart editors and the like. Other tools, such as microprocessor emulators, also have been designed for operation on general purpose computers to assist software engineers in the development of software. Such products have led to the developing discipline of Computer Aided Software Engineering (CASE).

One of the primary tasks of the software engineer is to analyze his or her code to determine whether the code operates as desired so that if an error is found, a debugging process may be conducted. Traditional debugging methods include slow manual processes such as inserting print statements into the software at particular locations so that the values of variables and the like may be checked to determine if they have the expected values. However, such an approach is no longer desired because it results in very high overhead and intrusion on the operation of the code being examined. Moreover, such print statements are difficult to use in embedded software systems because the target processor on which the software is to run must have a port for the printed statements to be communicated to the output. As known to those skilled in the art, embedded systems are software/hardware systems dedicated to an application which requires consistent and timely control of, and response to, external events. Embedded systems may also involve presenting information about those events and allowing user interaction with the parameters controlling the application. It is thus desirable to develop a debugging system which can be used to debug software having application specific I/0.

Software and hardware debugging systems have also been designed to assist the software engineer in the debugging process. However, such debuggers are generally restricted to use with particular language systems and, as a result, are static and non-real-time. Moreover, such debuggers are generally not widely available for embedded environments because of the unpredictability of external events to which the system responds. Debuggers have thus been of limited utility for embedded software systems.

In recent years, logic analyzers have also been used by software engineers to aid in debugging their code by providing low level views of microprocessor bus cycles and other logical blocks within the system. However, such logic analyzers require intimate knowledge of the microprocessor on which the software is operating in order to allow the user to view the data. Moreover, the data is generally not visible if the processor has an on board cache and is difficult to extract if the processor uses queueing or pipelining as in graphics systems, for example. Thus, logic analyzers are generally not geared for use by software engineers and, accordingly, are not particularly user friendly to software engineers.

Other debugger technology has been developed to appeal to the abstraction level of high level language software engineers. For example, a product called Validate/XEL TM has been provided to software engineers as an interface on top of an emulator which is designed to allow full speed emulation, modular architecture and high-speed downloads. However, such a system does not address the needs of large software design teams and cannot adequately handle rapidly increasing code sizes.

Another debugging tool which has been developed to assist software engineers is the Software Analysis Workbench (SAW). SAW hooks up to an IBM-Compatible PC-AT and ties to language tools in that environment. SAW can capture events in real-time and can monitor real-time execution without intrusion on the underlying software process. However, SAW does not address the problems of caches and prefetched queues and does not eliminate most dependencies on particular processors and language systems. A better debugging tool for embedded systems is desired.

Accordingly, the prior art does not provide an adequate means for analyzing complex host computer and embedded microprocessor based software systems and for cutting through the ambiguities of microprocessor prefetch and cache operations. Moreover, no prior art system is adequately designed to benefit large software design teams developing large and complex embedded applications making use of a multitasking operating system and/or object oriented systems with real-time requirements. The present invention has been designed to meet these needs.

SUMMARY OF THE INVENTION

The present invention meets the above-mentioned needs in the prior art by removing most microprocessor dependencies and making information visible even in microprocessors with caches and queues. The resulting method can be used across different language systems and for host or embedded environments without significantly intruding into the user's software. The present invention also provides a faster turnaround time for the software engineer's debug cycle by automating a previously quite tedious process. This is accomplished using software code markers as a low intrusion method of communicating data of interest for debugging. Such code markers are typically inserted at compile time or interactively during the debug session to make visible critical points in code execution such as function calls, task creation, semaphore operations and other resource usage so as to speed isolation of problems at test points during debugging of the user's software. As will be described herein, such code markers allow measurements including event tracing, software performance and system profiling to be conducted and presented to the software engineer as a system view at the desired level of abstraction.

As used herein, a code marker is an observable indication (external to the microprocessor) of the occurrence of an event in the execution of the software into which the marker is inserted. A code marker is the smallest standard microprocessor transaction required to communicate desired information to a chosen collection tool, thereby minimizing intrusion into the underlying software. Generally, higher level events and/or processors which contain instruction caches limit the intrinsic observability of these events. In these cases, additional instructions may be added to the software to produce simple, encoded, memory references to otherwise unused memory or I/0 locations that will always be visible to a logic analyzer as bus cycles. Code markers thus cause some intrusion into the underlying software in time and space and also use a small portion of the microprocessor's address space, but such code markers make tracing events by a conventional logic analyzer much simpler. The encoded information in each code marker also may be post-processed to recover the nature of the event.

Inserted markers provide a method of dynamically extracting information which would be expensive and difficult to obtain directly from a running system under test. Use of code markers also makes the state and operation of the system externally observable at low cost and with minimal intrusion. Possible implementations of such code markers include a simple address access when fixed on non-prefetch machines, encoded I/O write on procedure entry and exit, low intrusion print statements, task table dumps, encoded process I/O for task switching and exception event occurrences. Low intrusion print statements are used in a preferred embodiment described herein. Such print statements are extensions of the code marker concept to include the run time dump of data. The low intrusion print statement is thus very similar to a conventional print statement, except that no formatting is done by the target processor. Instead, the code marker ID with the binary data for the print statement is block transferred to the host computer for post processing. This dramatically reduces the overhead of a print statement, especially when the data is collected by a high level logic analyzer. Low intrusion print statements are also advantageous in that no special tools are necessary to implement them other than libraries.

A preferred embodiment of the present invention particularly relates to a system for dynamically characterizing and debugging a software system operating on a host computer. Such a system implements the concept of code markers described above and preferably comprises a marker database for storing code markers representative of characterizing and debugging information, means for inserting certain of the code markers from the marker database at predetermined locations within the software system, where the certain code markers represent desired user characterizing and debugging information at the predetermined locations, and means for collecting the inserted code markers from the software system during execution of the software system.

Preferably, the collected code markers are stored in a marker memory and the characterizing and debugging information associated with the collected code markers are displayed to the software engineer. In addition, the characterizing and debugging information preferably comprises either variables passed between respective functional code blocks or time values of measurements between detection of respective code markers collected during execution of the software system.

In a first embodiment of the invention, the collecting means comprises a marker collection software process which collects the code markers and state information associated with the code markers as they are received from the software system during execution. This marker collection software process may also time stamp the collected code markers as they are received from the software system during execution and place the time stamped code markers in the marker memory.

In a second embodiment of the invention, the collecting means comprises a hardware marker analyzer having pattern recognition means for isolating the code markers from the rest of a data stream output from the software system during execution and for identifying the isolated code markers. Such a marker analyzer preferably also comprises event counting/timing means for starting and stopping the code marker collecting on the occurrence of specific events and for time stamping the collected code markers as they are received from the software system during execution. Preferably, the marker memory further stores the collected code markers from the marker analyzer along with the count/timer information from the event counting/timing means. Also, in order to facilitate display, it is desirable for the marker analyzer to further comprise processing means for performing data reduction on the data stored in the marker memory by eliminating some of the code markers prior to display.

The scope of the invention further includes a method for dynamically characterizing and debugging a software system operating on a host computer. A preferred embodiment of such a method comprises the steps of:

adding a number of extra spaces in the source code of the software system following each functional source code block of the software system, the number of extra spaces being determined by at least one of the size of the function, number of software parameters and number of local variables of each functional source code block;

compiling the software system with the extra spaces;

linking the source code having the extra spaces with a marker library containing code marker data structures;

determining a type of code marker desired by a user from the marker library for use in characterizing and debugging the software system and storing the location and type of the desired code marker in a code marker database;

inserting each desired code marker into the software system at a predetermined location within the functional source code block such that other source code in the functional source code block is moved into the extra spaces without relinking of the source code with the marker library;

executing the software system on the host computer;

capturing the inserted code markers as they appear during the executing step;

checking the captured code markers against the code marker database to determine the location and type of the captured code markers; and displaying the captured code markers checked in the checking step.

Preferably, the method of the invention comprises the further steps of time stamping the captured code markers prior to the checking, step and calculating the processing time spent in a given functional source code block of the software system in accordance with the time stamps on the captured code markers. The method of the invention may also comprise the further step of calculating the relative and absolute amounts of processing time spent in each of the functional code blocks during the executing step. Preferably, the invention also displays the values of the software parameters of the software system for selected ones of the captured code markers.

Preferably, the code marker inserting step of the invention dynamically links respective functional source code blocks of the software system. This is preferably accomplished by performing the steps of:

extracting from the software system functional source code blocks which are to be dynamically linked and inserting each code markers desired by the user at predetermined locations within the extracted functional source code blocks;

compiling the extracted functional source code blocks so as to produce an object file;

dynamically linking the object file with a symbol object file for resolving references in the functional source code blocks to variables defined external to the functional source code blocks; and overwriting the dynamically linked extracted functional source code blocks on top of the corresponding functional source code blocks in a memory of the host computer.

Preferably, the dynamically linking step comprises the steps of parsing the object file, resolving external references of the extracted functions and reloading the extracted functions into the software system.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which:

FIG. 7 illustrates the insertion of code marker "dead space" for each function of the software system.

FIG. 8 illustrates an example of code marker instrumentation to print writes to variable "a" for the hardware and software marker collection techniques described with respect to FIGS. 5 and 6.

DETAILED DESCRIPTION OF THE PRESENTLY PREFERRED EMBODIMENTS

A system and method which affords the above-mentioned and other beneficial features in accordance with presently preferred exemplary embodiments of the invention will be described below with reference to FIGS. 1-8. It will be appreciated by those of ordinary skill in the art that the principles of the invention may be applied in environments other than those specifically illustrated here. Those skilled in the art will also appreciate that the description given herein is for explanatory purposes only and is not intended in any way to limit the scope of the invention. All questions regarding the scope of the invention may be resolved by referring to the appended claims.

There are two basic elements necessary for analyzing software for debugging purposes. First, a library of software source generators (signal generators) is needed to stimulate the software unit under test in a repeatable manner. Such signal generators may take the place of other units that are not yet written or not yet verified so that software simulation may be used to model hardware systems which are not yet built. Secondly, software output receivers or analyzers are needed. Analyzers are models linked to the software unit under test in a simulation environment which can be replaced with hardware analyzers for repeating the test in the target system. A system incorporating these and other elements is shown by way of example in FIG. 1.

Figure 1:
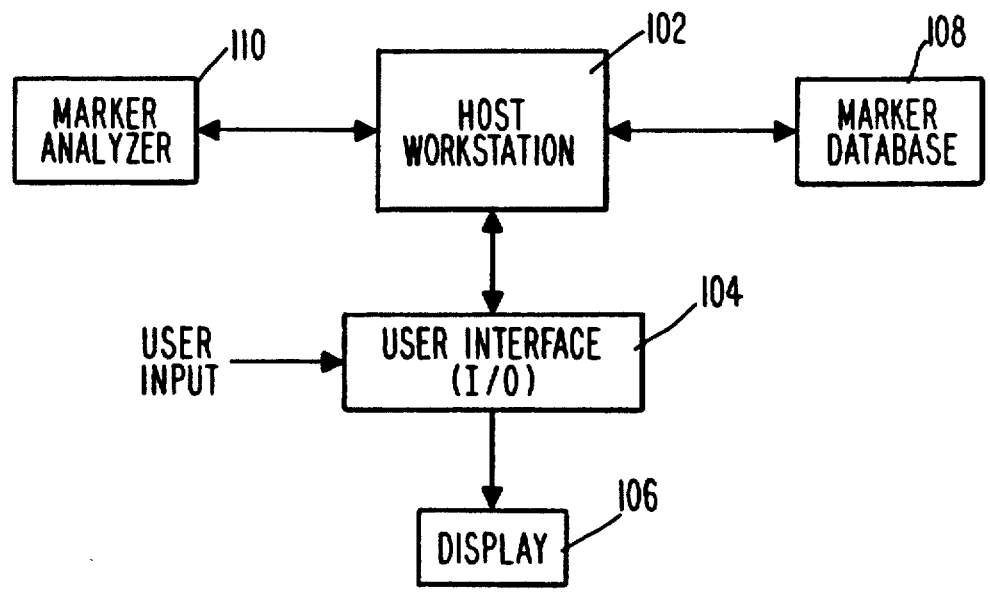
FIG. 1 illustrates in broad functional blocks the basic elements of the invention.

As shown in FIG. 1, a host workstation 102 in which software is being developed is accessed by the software engineer through user interface 104. During entry of the software and during debugging of the code, information is preferably displayed on display device 106. In accordance with the techniques to be described below, a marker database 108 and marker analyzer 110 are also provided for marking the software to be debugged with code markers for purposes of verifying time-based specifications and design margins of the software as well as performing simple, trustworthy, performance measurements. As will be described in more detail below, the code markers are written into otherwise unused I/O space in the microprocessor, thereby allowing execution to leave the microprocessor to thereby minimize intrusion in the software in both time and space. Code markers may also preferably be used to measure time domain activity such as task switching, function calls, and other software event and state changes. A method of implementing such code markers will now be described with respect to FIG. 2.

Figure 2:
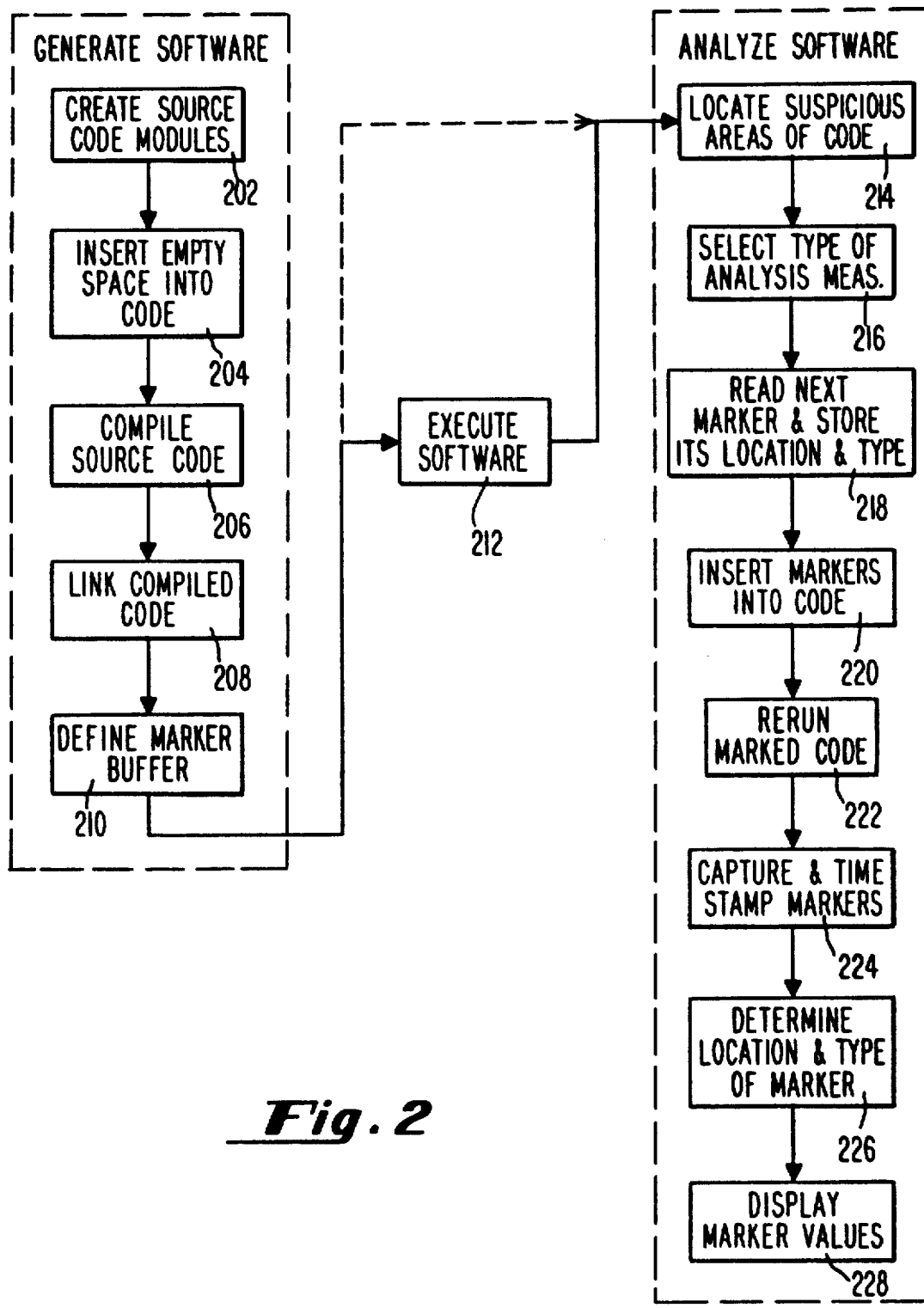
FIG. 2 illustrates the method of operation of the invention, including the steps of generating software, executing the software and analyzing the software in accordance with the techniques of the invention.

As shown in FIG. 2, the technique of the invention comprises three basic steps: generating software, executing the software, and analyzing the software. Generally, the software is generated beginning at step 202 by designing and generating source code modules from Computer Aided Software Engineering (CASE) tools of the software engineer. Then, as a first step to compiling a code module, a code marker instrumentation placeholding utility is run on the source code at step 204 for inserting empty space into the source code following each function of the code (see FIG. 7). This allows later addition of the code markers of the invention. The default size for the amount of space reserved may be determined by the size of the function, the number of parameters, the local variables of the code function and the like. However, the software engineer can choose options to increase this size if he or she wishes to have increased debugging capability or to eliminate it altogether. More details regarding this aspect of the invention will be given below with respect to FIGS. 3 and 4.

The code with the inserted spaces is then compiled at step 206. The software engineer may then link the code at step 208 and include one or more libraries that contain the marker data structures, thereby defining where the marker buffer resides in system memory at step 210. This marker buffer is preferably up to 128 bytes but can be reduced in size by only linking in the library for the particular debug measurements the software engineer wishes to perform.

The software generated as just described is then preferably loaded into the execution environment on the host processing system and run at step 212. The software engineer will then interpret execution results to determine if debugging is necessary. This step is separate from the analysis phase if the software engineer has some inherent way of determining proper functionality of his or her system. Optionally, as shown by broken line in FIG. 2, the software engineer may take the compiled code and go straight to the software analysis phase.

Upon entering the software analysis phase, the software engineer has decided that his or her code is not performing properly. The software engineer thus enters the analyzer environment, opens a code/structure/operating system browser window (if windows are available) and locates the suspicious area or areas of code at step 214. In a preferred embodiment, the user may pull down a menu to select the type of analysis measurement at step 216. For example, the type of analysis measurement may be "print variable" or "indicate exception event occurrence". The software engineer may then highlight or click on the desired variable(s) in the browser window. As each variable is selected, it is preferably displayed in the active specification window on display device 106. The software engineer may then select the menu command "process" or some such similar command so that the code marked by the software engineer is read by a marker insertion utility of the type described below with respect to FIGS. 5 and 6. The marker database 108 may then be queried by the insertion utility for the next unused ID, which tells the system database to log the location and type of code marker at step 218. The code marker is then inserted into the code at step 220, and the process is repeated for each requested marker. The size of the instrumented code is then checked against the reserved size (from step 204), and the code is downloaded to the execution environment. The software engineer then selects "execute" to start the analysis measurement and to rerun the marked code at step 222.

During execution, the code markers are captured and time-stamped and passed back to the measurement software (step 224). The measurement software then checks the code markers against the system database to determine location and type at step 226 and then displays the information in the measurement results window as desired by the software engineer at step 228. As the software engineer scrolls through this trace list, the browser window may optionally track the corresponding source routines to show the code marker definition and placement. Other measurements may be similarly performed by selecting measurement type and identifying measurement events. For example, global measurements such as procedure flow can be defaulted to all or implemented by selecting specific procedures. The code markers may then be removed by simply reloading the modified code fragments from the original object.

Preferably, for ease of use, the code browsing tools described herein should have the same interface as the interface used for software code design and generation.

Also, if a measurement is specified by pointing to some source or chart, preferably the software engineer does not have to open a different window to make changes.

When code markers have been placed in the code as described above, it will be necessary to update the symbol database as well in order to prevent other CASE tools from getting out of synchronization. This may or may not be sufficient depending upon how these other tools interact with the database. It also may be possible to provide limited code patching capability by relying on the reserved code marker area. This would trade off with the amount of debugging available for that software module.

As described above, the code marker techniques described herein may be used for many different measurements on the underlying software. For example, performance may be measured by determining the time spent in a particular code function, task or other module including or excluding the module's children. Code markers may also be used to count the module usage and event occurrence or to profile performance by indicating the relative and absolute times spent in each of a list of code modules of the software. Moreover, by using time stamps, code markers may be used to determine the elapsed time from event A to event B. Operating system interruptions such as process switches also may be included or excluded from such measurements.

Event flow analysis may also be measured using code markers in accordance with the techniques of the invention. In particular, the code markers of the invention may be used for a time-stamped trace of low intrusion print statements with or without data and to provide a time-stamped trace list of variable accesses. The code markers may also be used for a time-stamped execution flow including module entry and exits, task switches and the like. Other parameter contents may also be monitored, such as break points and branch flow of the underlying software. Implementation of such measurements are believed to be well within the skill of those skilled in the art and thus will not be described in more detail herein.

The code markers herein described preferably consist of 32 bits of data and 5 bits of type information. Examples of such marker types include procedure markers, low intrusion print statements, the data for low intrusion print statements, procedure data entry, events and event data, branches, operating system markers, operating system data or external user defined markers. The data contained in the marker data field will be dependent on the marker type. For example, for a code marker structure for the type "procedure", the code marker may comprise a bit to indicate whether the current code marker is an entry or exit code marker, 16 function bits representing the instrumented function, and 15 task bits which represent the instrumented task or object.

For the hardware marker collection method described below with respect to FIG. 6, code markers will require a 128 byte area in the user's address space. This will allow for 32 marker types, and the most significant 25 address bits may specify the code marker base address. The code marker thus can be written to this area using common move type processor instructions. On the other hand, with a software marker collection method described below with respect to FIG. 5, the code markers can be written to a software collection area via a system call having the following form:

Void tool(marker_type, marker_data)
U_int32 marker_type;
U_int32 marker_data.

Of course, other techniques may be implemented by those of ordinary skill in the art in accordance with the detailed description given below with respect to FIGS. 5 and 6.

As described above, code generated by the system engineer is instrumented such that it has spaces at the end of each function prior to compiling, thereby providing space for the insertion of code markers. There are two methods for such code instrumentation in accordance with the techniques of the invention: reverse engineering of the functions at the machine level (FIG. 3) and dynamic linking of the functions at a high level (FIG. 4). Each of these methods has advantages and drawbacks, and unfortunately, neither method is totally language or system independent. As will be described below, the ideal solution may be a combination of the two. In any event, both of these methods assume the existence of the afore-mentioned "dead area" following each function (as was inserted above in step 204). This "dead area" is inserted by a logic system design tool prior to the compile step as described above. The "dead area" may contain code or data or nops which are not referenced during the normal flow of the underlying program.

Figure 3:
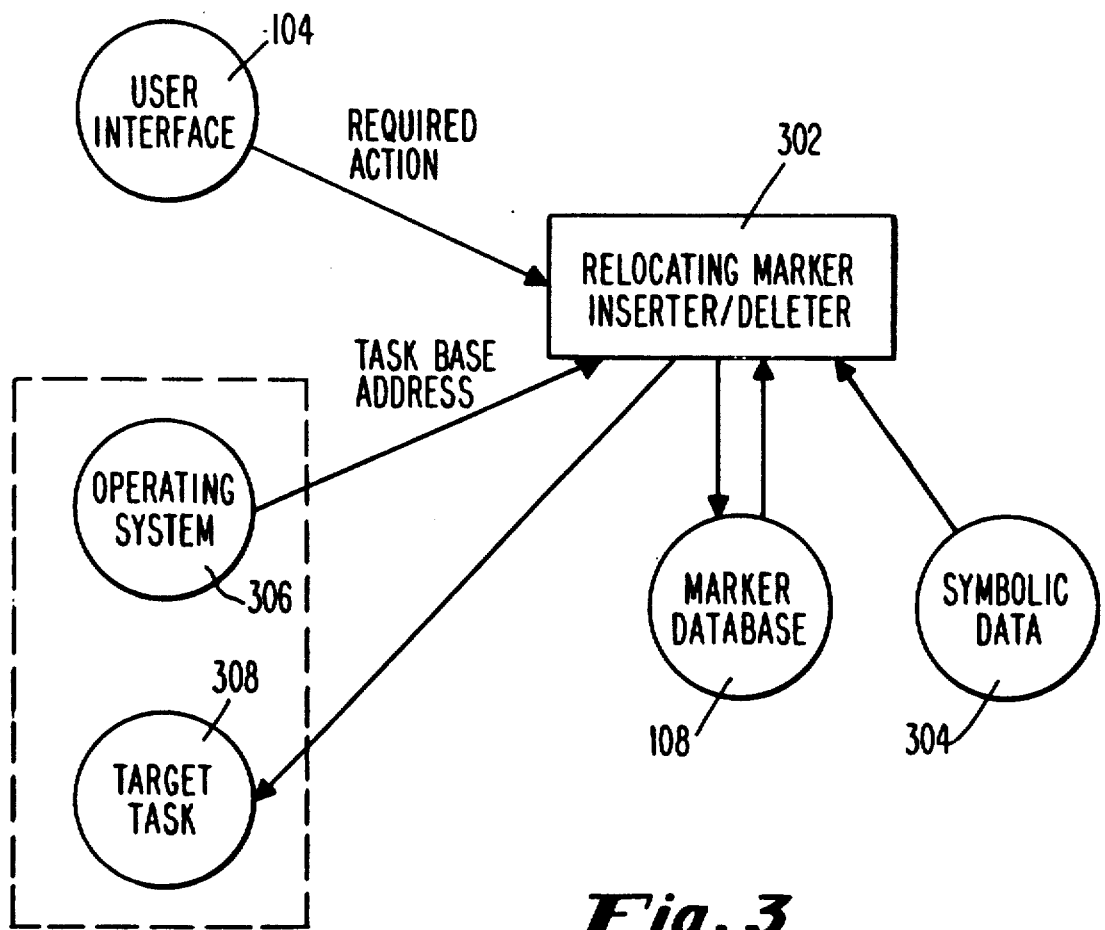
FIG. 3 illustrates a software code instrumentation technique illustrating reverse engineering of the software functions at the machine level.
Figure 4:
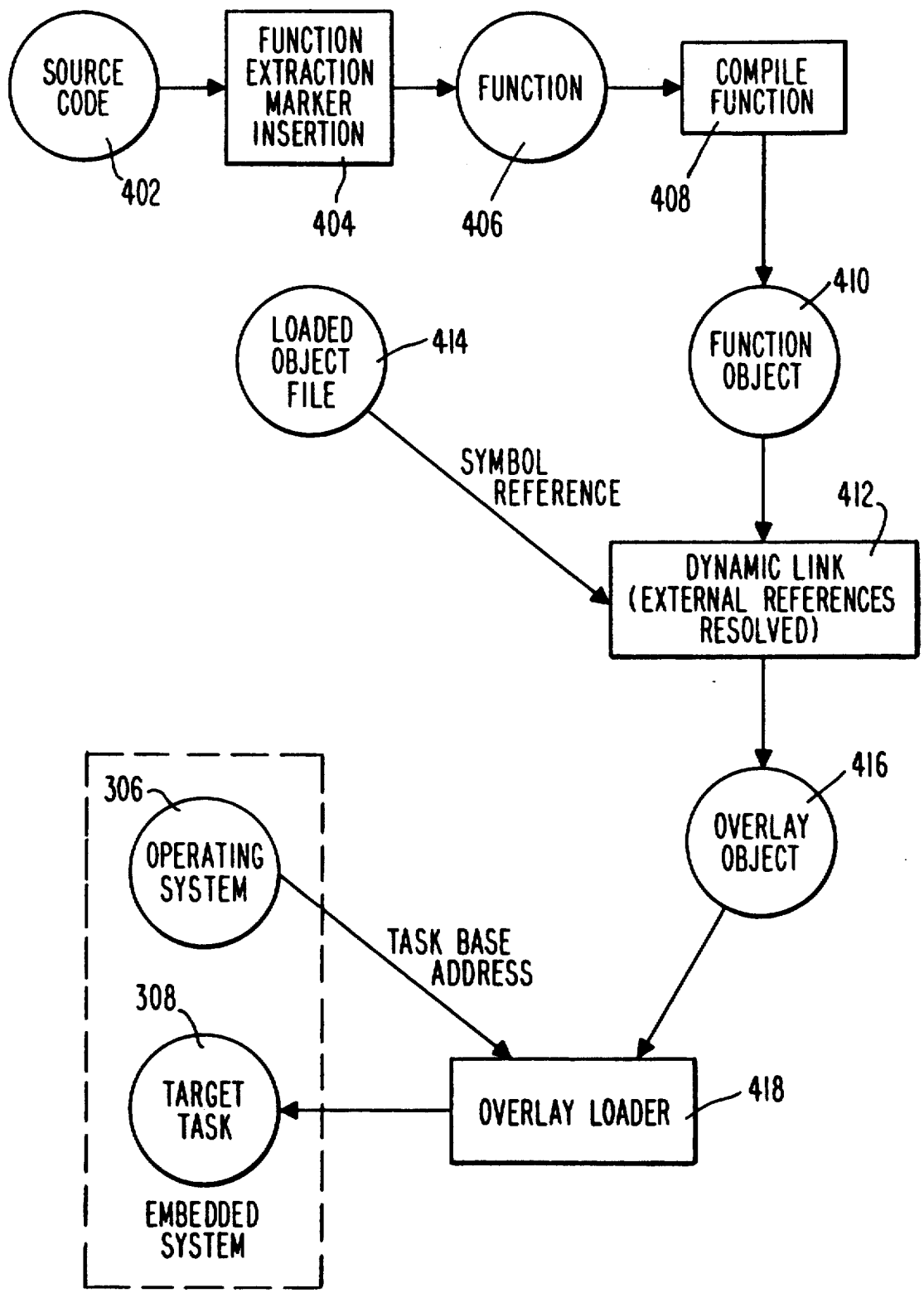
FIG. 4 illustrates another possible method of software code instrumentation using dynamic linking of the software functions at a high level.

FIG. 3 illustrates the reverse engineering code instrumentation technique at the machine level. This method relies on an expert knowledge of the processor instruction set. When it is desired to insert a code marker, a logic system design tool may scan the function at the machine level to interpret the variable flow. The code marker may then be inserted at the required position, and all code following the code marker would be moved down. All "local" branches would be relinked on the fly. A database of inserted marker positions would then be generated so that the code markers could be removed very quickly. Also, if the "dead area" contains positions of the local variables, then no knowledge of the stack frame would be required.

In particular, as shown in FIG. 3, the software engineer may input a required action via user interface 104 to a relocating marker inserter/deleter 302. Relocating marker inserter/deleter 302 communicates with marker database 108 to extract code markers for insertion in the software at the locations specified by the software engineer. Symbolic data 304 such as IEEE 695 data may then be modified or updated to prevent the other logic system design tools from getting out of synchronization as described above. As shown, the relocating marker inserter/deleter 302 operates by receiving the software task base address from the operating system 306 and inserting the code markers at the appropriate location within the target task 308. The code markers which are captured and displayed during the software analysis then may be used by the software engineer for debugging the underlying system.

Such a debugging method is advantageous in that no knowledge of the language system is required. It is potentially very fast, and all operations are done in the software engineer's program memory without reloading. However, such an approach requires a detailed knowledge of the microprocessor's instruction set since the program is almost a simulator. Also, such an approach makes it difficult to handle jump tables correctly without user interaction, and optimized code may be a problem. In any event, reverse engineering of the functions at the machine level may be accomplished as one preferred method of code instrumentation in accordance with the techniques of the invention.

The dynamic function linking method illustrated in FIG. 4 makes use of the compiler to rebuild functions after the insertion of the code markers of the invention. In such a case, the software engineer would indicate where the code marker is to be placed. A tool will then extract the function from the source code 402 and insert the marker at step 404 to obtain function 406. The software engineer will then call the compiler to compile the function at step 408 to produce an object file 410. Any external references of the function may then be resolved by a dynamic linker 412 which links in symbol references from a loaded symbol object file 414. The resulting overlay object file 416 may then be overwritten on top of the existing function in memory at step 418.

The dynamic linking approach has several advantages. Namely, no intimate knowledge of the processor is required, the markers can be placed anywhere with no help from the software engineer, and it is less complex However, the recompiling and reloading of the function may be slow. Also, such an approach is dependent on the object file format, which is troublesome since there is no established standard for object files. In any event, the dynamic linking of functions is a preferred method in accordance with the invention for rebuilding functions after the insertion of markers.

Both of the code instrumentation techniques described above with respect to FIGS. 3 and 4 require a fairly complex piece of software. The reverse engineering tool requires a relocating marker inserter/deleter 302, while the dynamic relinker requires code to parse the object file, resolve external references and reload. Both tools also require a fairly involved user interface. Also, as known to those skilled in the art, both approaches require access to program memory, which suggests some form of monitor or hardware access to user memory. In addition, if the embedded operating system 306 has relocated the code, then a physical base address must be supplied as shown in FIGS. 3 and 4. This implies some type of link with the operating system 306.

However, as noted above, a solution combining both methods may be constructed to solve these problems. For example, reverse engineering may be used to insert markers which are global in nature. These markers may be used for procedure entry/exit and also for procedure flow. This limits the scope of the reverse engineering tool and simplifies its construction. Also, performance of marker insertion is kept high by eliminating the compile/reference step required by dynamic linking. Dynamic linking may then be applied for user inserted markers such as low intrusion print statements. This would place the burden of variable referencing and code insertion on the compiler. Both of these methods thus provide useful techniques for inserting the code markers of the invention where they will be of most use.

Figure 5:
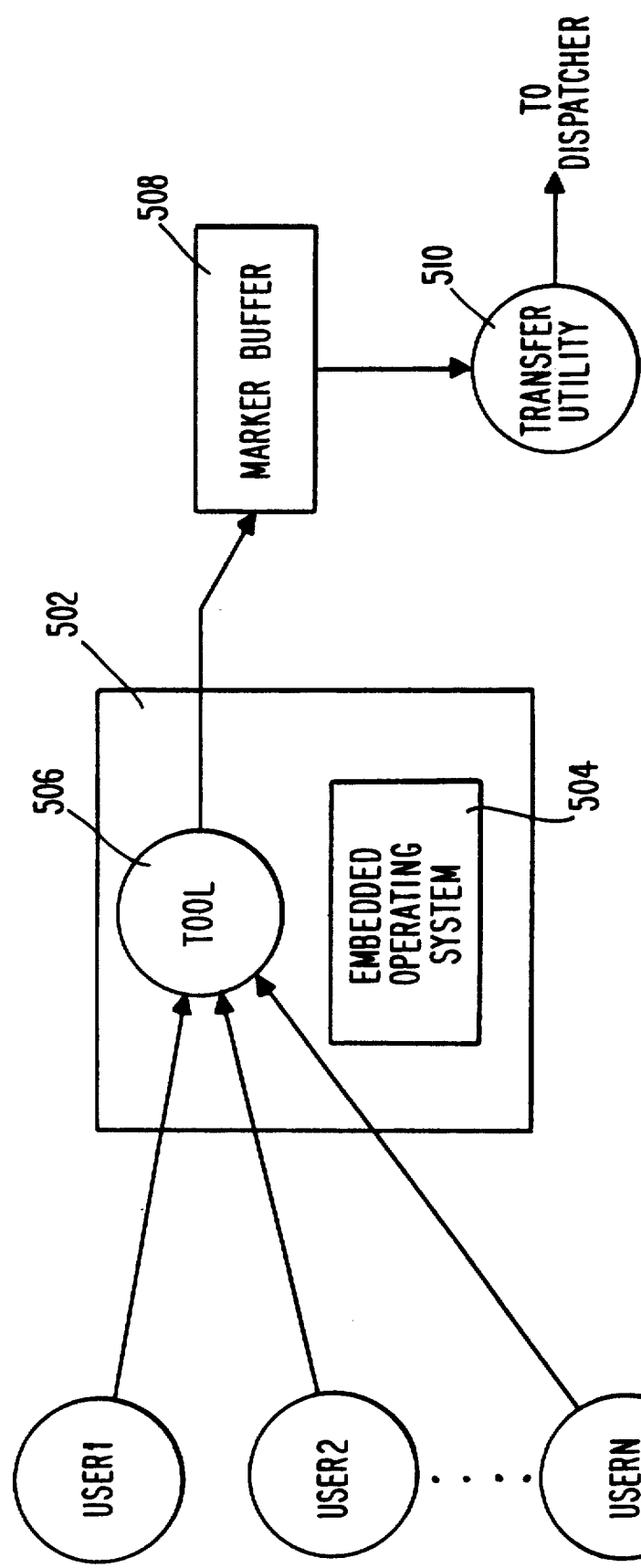
FIG. 5 illustrates a software method of marker collection in accordance with the techniques of the invention.

FIG. 5 illustrates a software method of marker collection (step 224) in accordance with the invention. Such a software method is generally preferred in that it is inexpensive and flexible. As described herein, marker collection is the technique of reading a stream of code markers (events), processing the code markers, acting on the code markers and transmitting the code markers to a dispatcher for subsequent display on the display device 106. The software marker collection method shown in FIG. 5 is implemented as a group of functions for code marker collection which requires no custom hardware and can be executed in software simulators. When executing in the software engineer's target system, it makes use of a communications port to the host computer. However, because this method does not use custom hardware, the CPU cycles to process the code markers must be taken from the target CPU, thus causing a higher level of time-based intrusion than a hardware marker collection method. However, as noted above, software marker collection is relatively inexpensive to implement and should be applicable to all execution environments.

During operation of the software marker collection system of FIG. 5, the software engineer writes the code for his or her software system. The source code is then run through a utility which pads the code with growth space between functions as described above with respect to FIG. 2. The code is then compiled and loaded, and once the code is running, the software engineer may browse his source code and select a measurement which causes the code instrumenter (FIGS. 3 and 4) to insert code markers in appropriate places for the measurement. Once this is accomplished, the code markers are inserted in the form of a call to the host processor 502 having an embedded operating system 504 and an operating system routine called "TOOL" 506. The growth space between functions allows each function to grow as markers are inserted using TOOL 506. The marker collection process TOOL 506 collects, processes and transmits the code markers from the user programs to a marker buffer 508 for transfer to a transfer utility 510. Presentation software then takes over and displays the result of the measurement using the code markers.

The software TOOL 506 that collects the code markers is generally responsible for at least four things. Namely, TOOL 506 collects code markers and state information associated with the code markers as they are received from the software engineer's software system. The code markers are also time stamped if possible and then transmitted with their data to their host processor in an efficient manner. The code marker stream is also processed to make decisions to send status to the software engineer's software system if desired.

As shown in FIG. 5, code markers in the software engineer's code take the form of a call to TOOL with two parameters: (1) the address or type information and (2) the encoded data (see FIG. 8). These two parameters are necessary and sufficient for the transfer utility 510 to decode the code markers before they are sent to the display. The function TOOL 506 must take as little time from the software engineer's software system as possible, and is accordingly implemented as a nonpreemptable operating system service which time stamps and places each marker into the marker buffer 508 in accordance with techniques known to those skilled in the art.

The marker buffer 508 is preferably a FIFO queue which stores the markers in raw form as they wait to be read by the transfer utility 510 for display. Transfer utility 510 takes code markers from marker buffer 508 and transmits them to the dispatcher for display. Transfer utility 510 is generally given a lower priority than the software engineer's software so that it runs in what would normally be idle machine cycles in the noninstrumented system. The transfer utility 510 can, however, be given a higher priority if the marker buffer 508 becomes full. TOOL 506 is preferably responsible for keeping the marker buffer 508 from overflowing. For example, if TOOL 506 finds the marker buffer 508 full when it tries to write a code marker, it preferably triggers the transfer utility 510 to transfer some code markers to the host processor for display, thereby further emptying marker buffer 508.

Figure 6:
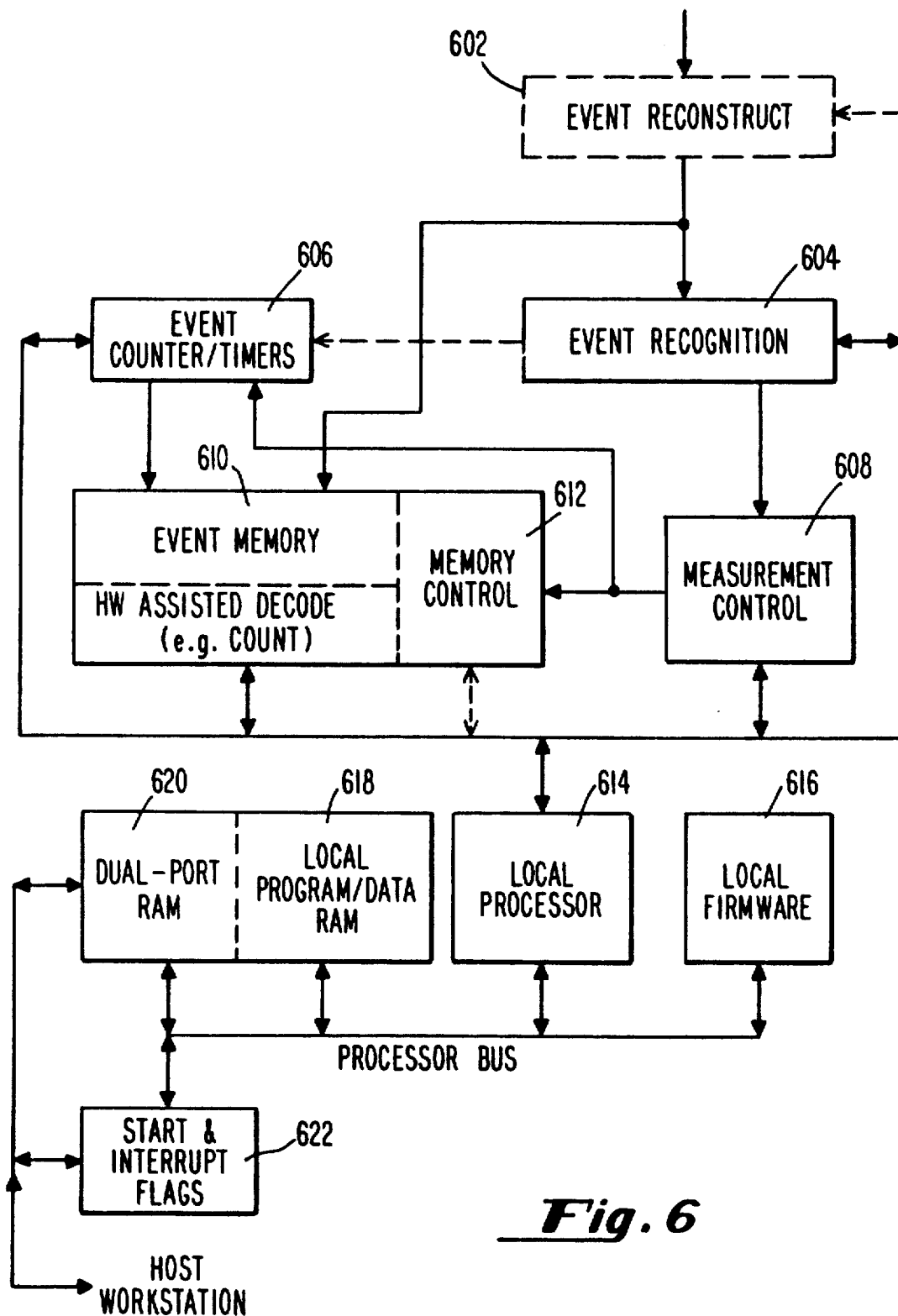
FIG. 6 illustrates a hardware method of marker collection in accordance with the techniques of the invention.

FIG. 6 illustrates a hardware analyzer circuit for implementing a hardware method of marker collection in accordance with the techniques of the invention. The hardware analyzer for marker collection illustrated in FIG. 6 provides a solution with much lower intrusion than the software collection method described above. It also provides high performance, since instead of requiring a special function call to time-stamp and pass markers to a collection buffer in memory, the code markers are instrumented as writes to memory at defined addresses while the hardware captures and time-stamps the code markers in real time in a manner similar to a standard bus analyzer. This greatly reduces the execution speed intrusion and requires only the basic code marker place holding space in the software engineer's code and does not include the extra code marker processing code in the software engineer's software. The hardware analyzer also may include local processing to provide data reduction for many measurements. Such hardware collection is primarily aimed at the embedded execution environment where all or part of the target software is being executed in the target hardware and the added intrusion of the software collection methods may not be acceptable.

The hardware code marker analyzer of FIG. 6 requires a preprocessor to connect into the software engineer's software target system at a point where the instrumented markers are visible. The most direct point would be through the processor pins of the target microprocessor, but it may also be available on a backplane or communications port. The analysis system must also have access to a channel where run control and high-performance memory access are provided in order to overwrite the instrumented code fragments. This may be supplied by an emulator or simply a communications port to an onboard hardware monitor or the embedded operating system.

The circuit of FIG. 6 takes data from the preprocessor/interface at an event reconstruct block 602, and the output of the circuit of FIG. 6 communicates collected and reduced data back to the host platform for further processing and presentation to the software engineer. In particular, the data stream is received at event reconstruct block 602 and may be in various byte/word/longword widths depending on the processor and the design of the particular target system. During event reconstruction, several code markers are reconstructed into one as when four byte cycles are needed to reconstruct one 32-bit marker. Event reconstruct block 602 thus reformats the data field to a specific width such as 32 bits and simplifies the recognition and control hardware that is needed. Such a function may be provided by the preprocessor interface, and accordingly, event reconstruct block 602 is shown in phantom.

The output of event reconstruct block 602 is then provided to event recognition circuit 604 and to event memory 610. Event recognition circuit 604 utilizes pattern recognition in order to isolate code markers from the rest of the data stream received at an input thereof as well as to identify types of code markers or specific code markers for control of various measurements. Preferably, the upper address bits of the code marker space are defined and fixed, and if it is contiguous, it will be the same for all code markers, thereby reducing complexity. The lower address field and status field may also require recognition logic to identify a set number of events for measurement control. This part of the circuit must be fast enough to allow the fastest data write rate of the processor or software system being analyzed.

Event counter/timer 606 is also provided for event counting and duration type measurements which require a set of counter/timers to start and stop on specific events. Event counter/timer 606 preferably also handles the time stamping function for standard event tracing. Preferably, measurement control state machines 608 are also provided to take inputs from the event recognition circuit 604 and the counter/timer logic circuit 606 to control event storage and other measurement dynamics. Measurement windowing and sequencing (as necessary) are handled by measurement control block 608. Signals of particular events may also be driven out for use by external hardware as desired.

Event storage in accordance with the invention is accomplished through a block of FIFO memory in event memory 610 that takes code marker data and counter/timer information as input data under control of memory control 612 and is dynamically unloaded by a local processor 614 for data reduction. The lower address field, data field and timer data are also stored. As shown, hardware assisted decoding logic may also be added to assist in the decoding of the stored data, such as gray to binary count translation, so as to increase performance of data reduction prior to display. In a preferred embodiment, event memory 610 comprises a large FIFO buffer which stores a code marker if measurement control block 608 determines that the input code marker is to be stored. Preferably, the FIFO buffer comprises two kilobytes of high speed FIFO to operate as a buffer and a deeper FIFO having at least 500 kilobytes connected to the smaller buffer. The output of the deep FIFO is then output to local processor 614 for data reduction in which certain code markers may be thrown out.

The local processor subsystem comprising elements 614-622 preferably accomplishes configuration and control of the basic measurement hardware by dynamically monitoring measurements and unloading and processing/reducing data before transmitting the reduced data to the host workstation for display. For this purpose, local firmware 616 is connected to the local processor 614 over a processor bus and connected to local program/data RAM 618 and dual-port RAM 620 for communication through a port to the host workstation. A start and interrupt flag register 622 may also be provided so that communication to the host workstation may be managed through interrupts, flags and the dual-port RAM 620 in accordance with known techniques. Such a high-speed communication channel to the host is needed to maintain system performance due to the amount of measurement data being passed. In preferred embodiments, the output of the dual-port RAM 620 and start and interrupt flag register 622 thus may be connected to a local area network which hooks into one or more workstations.

FIG. 7 illustrates the technique of the invention whereby code marker dead space is inserted for each function within the software engineer's system and a code marker type definition area is provided. These marker types may include the types described above.

FIG. 8 illustrates an example of code marker instrumentation to print writes to a variable "a" using the hardware and software code marker collection techniques of the invention. In particular, as shown, the simple user code in the leftmost column is modified for hardware collection to include low intrusion print statements which print the inserted code markers, their associated values, and other variable values such as, in this case, the variable "a". When software collection is used, on the other hand, the aforementioned TOOL instruction is instead called and given the variables printmk_0 as type information and MK_ID001 as encoded data. Values for the variable "a" may also be passed to subroutines as indicated. As shown in FIG. 8, the user's software program is extended to include the print statements, but this poses no problem since the inserted dead space allows such expansion. If desired, this dead space may be removed once the debugging process has been completed.

As noted above, the insertion of the code markers at compile time or interactively during the debug session as herein described make visible critical points in code execution, such as function calls, task creation, semaphore operations and other resource usage. This speeds isolation of problems at test points and also allows performance analysis and event analysis without the ambiguities of microprocessor prefetch and cache operations as in the prior art. Also, by using low intrusion print statements which use code markers together with binary data transfer and a host database to move formatting out of the target system and into the debugger, it is possible to reduce the volume of data transfer required for each print. Also, when used in conjunction with a logic analyzer, the invention reduces the overhead of the debug I/0 transfer to a few simple memory writes. Moreover, time tagging may be automatically added with little overhead so that time critical software may be monitored by simply inserting markers at appropriate places in the code and then measuring the time between markers during running of the program. This information may then be presented to the software engineer at a high level of abstraction for purposes of taking appropriate action without detailed knowledge of the underlying processor.

The present invention is believed to contribute to the art in the area of code marker insertion and collection by adding the ability to insert/remove code markers dynamically. Since the code markers may be inserted without recompiling the entire program, the speed of insertion/deletion is improved, and since the user interface is at a high level, the code markers may be easily inserted and deleted. Also, since the same code marker definitions are used for different code marker collection methods, the ease of switching between collection methods is facilitated. Moreover, the same method of code marker collection may be used across different language systems.

As described above, these code marker collection methods are broken down into two categories: software collection and hardware collection. In the case of hardware collection, the present invention includes a hardware analyzer which has true dual-ported marker memory, high speed marker compare and a deep code marker memory. Onboard marker reduction processors may also be used to increase throughput of the system. Software collection, on the other hand, allows a majority of measurements to be performed in a nonhardware assisted environment at a low cost. Software collection tasks are thus advantageous for on-site debugging/characterization of the software engineer's system.

Although exemplary embodiments of the invention have been described in detail above, those skilled in the art will readily appreciate that many additional modifications are possible in the exemplary embodiments without materially departing from the novel teachings and advantages of the invention. For example, the technique of the invention may be used in object-oriented software systems as well as existing logic analyzer systems. Also, a feature may be added whereby code markers are automatically inserted into the software and turned on or off prior to compiling. Such a dormant marker activator would further facilitate debugging in that the debugger can selectively concentrate on different aspects of the software system without reinserting code markers. Accordingly, all such modifications are intended to be included within the scope of the invention as defined in the following claims.

We claim:

1. A system for dynamically characterizing and debugging a software system operating on a host computer, comprising:
   a marker database for storing code markers representative of characterizing and debugging information;
   means for inserting certain of said code markers from said marker database at predetermined locations within compiled functional source code blocks of said software system whereby other source code in said compiled functional source code blocks is thereby moved into empty spaces int he compiled functional source code blocks of said software system such that said compiled functional source code blocks may be executed without recompiling of said functional source code block with said inserted code markers, said empty spaces in the compiled functional source code blocks of said software system having been inserted prior to compiling of said source code of said software system at positions logically between separate functional source code blocks of said software system, said inserted code markers representing desired user characterizing and debugging information at said predetermined locations;
   means for collecting said inserted code markers from said software system during execution of said software system;
   a marker memory for storing said collected code markers; and
   means for displaying the characterizing and debugging information associated with the collected code markers.

2. A system as in claim 1, wherein said characterizing and debugging information comprises at least one of (a) parameter values for software parameters to be monitored which are passed between respective functional code blocks and (b) time measurements between detection of respective code markers collected during execution of said software system.

3. A system as in claim 1, wherein said collecting means comprises a marker collection software process which collects said code markers and state information associated with the code markers as they are received from said software system during execution.

4. A system as in claim 3, wherein said marker collection software process time stamps said collected code markers as they are received from said software system during execution and places the time stamped code markers in said marker memory.

5. A system as in claim 1, wherein said collecting means comprises a marker analyzer having pattern recognition means for isolating said code markers from the rest of a data stream output from said software system during execution and for identifying said isolated code markers.

6. A system as in claim 5, wherein said marker analyzer further comprises event counting/timing means for starting and stopping the code marker collecting on the occurrence of specific events and for time stamping said collected code markers as they are received from said software system during execution.

7. A system as in claim 6, wherein said marker memory stores said collected code markers from said marker analyzer and count/timer information from said event counting/timing means.

8. A system as in claim 7, wherein said marker analyzer further comprises processing means for eliminating some of the code markers stored in said marker memory prior to display of said code markers by said displaying means.

9. A method for dynamically characterizing and debugging a software system operating on a host computer, comprising the steps of:
   adding a number of extra spaces in the source code of said software system following each functional source code block of said software system, said number of extra spaces being determined by at least one of the size of the function, number of software parameters and number of local variables of each functional source code block;
   compiling said software system with said extra spaces;
   linking the source code having said extra spaces with a marker library containing code marker data structures;
   determining a type of code marker desired by a user from said marker library for use in characterizing and debugging said software system and storing the location and type of the desired code marker in a code marker database;
   inserting each desired code marker into said software system at a predetermined location within said functional source code block such that other source code in said functional source code block is moved into said extra spaces without relinking of said source code with said marker library;
   executing said software system on said host computer;
   capturing said inserted code markers as they appear during said executing step;
   checking said captured code markers against said code marker database to determine the location and type of said captured code markers; and
   displaying the captured code markers checked in said checking step.

10. A method as in claim 9, comprising the further step of time stamping the captured code markers prior to said checking step.

11. A method as in claim 10, comprising the further step of calculating the processing time spent in a given functional source code block of said software system in accordance with time stamps on said captured code markers.

12. A method as in claim 9, wherein said displaying step includes the step of displaying values of said software parameters of said software system for said captured code markers.

13. A method as in claim 9, wherein said code marker inserting step dynamically links respective functional source code blocks of said software system by performing the steps of:

extracting from said software system functional source code blocks which are to be dynamically linked and inserting each code marker desired by said user at predetermined locations within said extracted functional source code blocks;

compiling said extracted functional source code blocks so as to produce an object file;

dynamically linking said object file with a symbol object file for resolving references in said functional source code blocks to variables defined external to said functional source code blocks; and overwriting the dynamically linked extracted functional source code blocks on top of the corresponding functional source code blocks in a memory of said host computer.

* * * * *